United States Patent
Fracchia

(10) Patent No.: US 10,890,130 B2
(45) Date of Patent: Jan. 12, 2021

(54) METHOD FOR STARTING A HYBRID VEHICLE

(71) Applicant: Jaguar Land Rover Limited, Coventry (GB)

(72) Inventor: Riccardo Fracchia, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 160 days.

(21) Appl. No.: 16/014,224

(22) Filed: Jun. 21, 2018

(65) Prior Publication Data

US 2019/0032586 A1    Jan. 31, 2019

(30) Foreign Application Priority Data

Jul. 25, 2017  (GB) .................................. 1711963.7

(51) Int. Cl.
*B60W 10/02*    (2006.01)
*B60W 10/06*    (2006.01)
(Continued)

(52) U.S. Cl.
CPC ............ *F02D 41/064* (2013.01); *B60K 6/387* (2013.01); *B60K 6/48* (2013.01); *B60W 10/02* (2013.01); *F02N 11/006* (2013.01); *B60K 2006/4825* (2013.01); *B60W 10/06* (2013.01); *B60W 10/08* (2013.01); *B60W 20/40* (2013.01);
(Continued)

(58) Field of Classification Search
CPC ...... B60W 10/02; B60W 10/06; B60W 10/08; B60W 10/26; B60W 20/13; B60W 20/40; B60W 2510/246; B60W 2710/021
See application file for complete search history.

(56) References Cited

U.S. PATENT DOCUMENTS

2013/0138286 A1* 5/2013 Sawayama ............ B60W 10/06
                                                            701/22
2013/0311018 A1* 11/2013 Nissato ................. B60W 10/02
                                                            701/22

(Continued)

FOREIGN PATENT DOCUMENTS

EP          3 050 766 A1    8/2016

OTHER PUBLICATIONS

Patents Act 1977: Combined Search and Examination Report under Sections 17 and 18(3), UKIPO Application No. GB1711963.7, dated Dec. 1, 2017, 7pp.

*Primary Examiner* — Edwin A Young
(74) *Attorney, Agent, or Firm* — Miller Nash Graham & Dunn LLP

(57) ABSTRACT

A method for starting a hybrid vehicle 100 comprising an internal combustion engine 301, an electric motor 320 coupled to a driveline of the hybrid vehicle, a traction battery 302 configured to supply energy to the electric motor, and an open clutch 310 decoupling the internal combustion engine from the driveline, the method comprising: determining s503, s505 whether a temperature-dependent parameter associated with the traction battery satisfies a first condition; starting s535 the electric motor; monitoring s541 satisfaction of a second condition while internal combustion engine speed is greater than zero; and attempting s545 to close the clutch to couple the internal combustion engine to the driveline if the second condition is satisfied.

19 Claims, 6 Drawing Sheets

(51) Int. Cl.
  B60W 10/08 (2006.01)
  F02D 41/06 (2006.01)
  B60K 6/387 (2007.10)
  F02N 11/00 (2006.01)
  B60K 6/48 (2007.10)
  B60W 20/40 (2016.01)
  F02N 11/08 (2006.01)
(52) U.S. Cl.
  CPC ............... *B60W 2510/0676* (2013.01); *B60W 2510/081* (2013.01); *B60W 2510/246* (2013.01); *F02N 11/0851* (2013.01); *F02N 2200/022* (2013.01); *F02N 2200/041* (2013.01); *F02N 2200/064* (2013.01); *F02N 2300/102* (2013.01); *F02N 2300/2002* (2013.01)

(56) References Cited

U.S. PATENT DOCUMENTS

| | | |
|---|---|---|
| 2016/0023646 A1 | 1/2016 | Nedorezov et al. |
| 2016/0214600 A1 | 7/2016 | Miyaishi |

* cited by examiner

METHOD FOR STARTING A HYBRID VEHICLE

CROSS-REFERENCE TO RELATED APPLICATION

This application claims priority under 35 U.S.C. § 119 to Great Britain Application No. 1711963.7, filed Jul. 25, 2017, the content of which is incorporated herein by reference in its entirety.

TECHNICAL FIELD

The present disclosure relates to a method for starting a hybrid vehicle. In particular, but not exclusively it relates to a method for starting a hybrid-electric vehicle.

Aspects of the invention relate to a method, a system, apparatus, an electronic controller and a computer program.

BACKGROUND

A hybrid-electric vehicle may comprise an automatically controlled open clutch decoupling its internal combustion engine from the transmission. If the vehicle is to set off using engine torque, it will be necessary to close the clutch.

Energy for closing the clutch can be supplied from oil pressure applied by a transmission oil pump. Energy input to the transmission oil pump may be provided by coupling the transmission oil pump to a shaft in the transmission, for example via a belt. However, if the shaft is not being driven by the engine, the transmission oil pump cannot be driven by the engine and energy must be supplied another way.

The hybrid-electric vehicle may also comprise an electric motor on the wheel side of the clutch. If the electric motor is controlled to rotate the shaft to a predetermined speed, the transmission oil pressure will be sufficient for actuating the clutch.

Energy for driving the electric motor may be supplied by a traction battery of the vehicle. However, if the traction battery has insufficient power, for example due to freezing conditions, the electric motor may spin too slowly in a 'brown-out' condition.

SUMMARY OF THE INVENTION

Aspects and embodiments of the invention provide a method, a system, apparatus, an electronic controller and a computer program as claimed in the appended claims.

It is an aim of the present invention to address disadvantages of the prior art. The present invention is not necessarily concerned with only cold starts, but is also applicable to other extreme conditions in which there is a high risk of brown-out.

According to an aspect of the invention there is provided a method for starting a hybrid vehicle comprising an internal combustion engine, an electric motor coupled to a driveline of the hybrid vehicle, a traction battery configured to supply energy to the electric motor, and an open clutch decoupling the internal combustion engine from the driveline, the method comprising:
  determining whether a temperature-dependent parameter associated with the traction battery satisfies a first condition;
  starting the electric motor;
  monitoring satisfaction of a second condition while internal combustion engine speed is greater than zero; and
  attempting to close the clutch to couple the internal combustion engine to the driveline if the second condition is satisfied.

This provides the advantage that a second condition for closing the clutch must be satisfied for the operating scenario in which the first condition is satisfied. For example, satisfaction of the first condition may be indicative of an extreme operating scenario in which the traction battery is known to perform poorly. The second condition defines an appropriate requirement for such operating scenarios. For example, the method may be for cold-starting the hybrid vehicle.

In some examples, the temperature-dependent parameter is a rate of energy delivery from the traction battery or a temperature of the traction battery.

This provides the advantage that the method is relevant to cold-soak and other extreme operating scenarios in which a rate of energy delivery from the traction battery is particularly low. Further, the parameter is a type published by a range of traction battery electronic controllers.

In some examples, the first condition is capable of being satisfied if the temperature-dependent parameter is below a threshold.

This provides the advantage that the condition in which monitoring of the second condition is needed is precisely defined.

In some examples, satisfaction of the second condition is indicative that energy density in a system for closing the clutch is sufficient for the clutch to be closed. The energy density may be pressure in the case of a fluid-filled system.

This provides the advantage of reducing the chance that the vehicle will be left stranded with its traction battery depleted and engine off.

Electric motor speed may be a reliable indicator of the energy density in the system for closing the clutch because the system may be powered by rotational energy in the driveline generated by the electric motor. In some examples, the second condition is capable of being satisfied if the electric motor speed is at least at a predetermined minimum speed, greater than zero and less than internal combustion engine idle speed.

This provides the advantage of reducing traction battery power consumption for attempting to close the clutch.

In some examples, the second condition is satisfied if the electric motor speed is at least at the predetermined minimum speed for at least a predetermined duration.

This provides the advantage of attempting to close the clutch when the system is stable, again reducing the chance of engine stall during clutch closing.

In some examples, if after a timeout the second condition has not been satisfied the method comprises attempting to close the clutch to couple the internal combustion engine to the driveline.

This provides the advantage of attempting to avoid certain depletion of the traction battery in extreme operating scenarios in which it is impossible to even satisfy the second condition.

In some examples, if the temperature-dependent parameter does not satisfy the first condition the method comprises attempting to close the clutch if the electric motor speed reaches an engine idle speed condition.

This provides the advantage of reducing NVH in normal operating scenarios.

In some examples, the method comprises controlling a rate of closing of the clutch in dependence on whether the temperature-dependent parameter satisfies the first condition.

This provides the advantage of reducing the chance of engine stall during clutch closing.

In some examples, if the temperature-dependent parameter satisfies the first condition the rate of closing of the clutch is controlled to be relatively slower than if the temperature-dependent parameter does not satisfy the first condition.

This provides the advantage of reducing the chance of engine stall during clutch closing compared to an operating scenario in which the first condition is not satisfied.

In some examples, energy supply from the traction battery to at least one vehicle subsystem is inhibited until after the clutch has been successfully closed.

This provides the advantage of prioritising clutch closing involving reducing other loads on the traction battery.

In some examples, the at least one vehicle subsystem comprises at least one of:
  a DC-DC converter;
  a chassis electrical subsystem;
  all consumers on a voltage bus other than the electric motor;
  a vehicle lighting subsystem; or
  a heating or cooling subsystem.

This provides the advantage of prioritising clutch closing involving reducing other less important loads on the traction battery.

In some examples, energy supply from the traction battery to the at least one vehicle subsystem is inhibited in dependence on a determination that the second condition has not yet been satisfied. In some examples, the inhibition requires not only a determination that the second condition has not yet been satisfied, but also a determination that electric motor speed is below a speed threshold and a determination that the rate of energy delivery is below a rate threshold.

This provides the advantage of reducing other loads on the traction battery in the event of one or more failures to satisfy the second condition, to increase the chance of success.

In some examples, energy supply from the traction battery to the at least one vehicle subsystem is inhibited in dependence on a below-threshold temperature-dependent parameter of the traction battery.

This provides the advantage of reducing other loads on the traction battery only when deemed necessary based on the operating scenario of the traction battery.

In some examples, energy supply from the traction battery to the at least one vehicle subsystem is inhibited in dependence on a failed attempt to close the clutch. In some examples, the inhibition requires not just a failed attempt but also a below-threshold temperature-dependent parameter.

This provides the advantage of reducing the chance of repeated failures to close the clutch.

In some examples, energy supply from the traction battery to a first vehicle subsystem is inhibited in dependence on a temperature-dependent parameter of the traction battery being below a first threshold, and wherein energy supply from the traction battery to a second vehicle subsystem is inhibited in dependence on a temperature-dependent parameter of the traction battery being below a second different threshold.

This provides the advantage that subsystems are weighted based on their importance, so there are more operating scenarios in which less important subsystems are inhibited while more important subsystems are not inhibited, than there are operating scenarios in which both are inhibited.

In some examples, the first vehicle subsystem is associated with thermal management and/or cabin conditioning, wherein the second vehicle subsystem is a DC-DC converter, and wherein the second threshold is lower than the first threshold.

This provides the advantage that functions which are more noticeable to the user such as DC-DC powered subsystems (e.g. lights, heating fans, infotainment) are assigned a higher importance than thermal functions. There are more operating scenarios in which thermal functions are inhibited while DC-DC functions are not inhibited, than there are operating scenarios in which both are inhibited.

In some examples, the electric motor is started after a starter motor has completed cranking the internal combustion engine.

This provides the advantage of not consuming traction battery energy that would otherwise be consumed needlessly spinning the electric motor while waiting for the internal combustion engine to complete cranking. This is useful particularly in operating scenarios in which cranking takes longer than usual.

In some examples, the electric motor is started after the starter motor has completed cranking the internal combustion engine in dependence on a below-threshold temperature-dependent parameter of the traction battery.

This provides the advantage of only waiting for cranking in certain operating scenarios, such as cold-soak or other extreme conditions. In normal operating scenarios, the electric motor may be energised during cranking so that powertrain connection to the driveline can be completed as quickly as possible.

According to another aspect of the invention there is provided a method for starting a hybrid vehicle comprising an internal combustion engine, an electric motor coupled to a driveline of the hybrid vehicle, a traction battery configured to supply energy to the electric motor, an open clutch decoupling the internal combustion engine from the driveline, and a pump configured to supply energy for closing the clutch, wherein the pump is configured not to receive energy from the internal combustion engine at least while the clutch is open, the method comprising:
  determining whether a temperature-dependent parameter associated with the traction battery satisfies a first condition;
  starting the electric motor;
  while internal combustion engine speed is greater than zero, monitoring satisfaction of a second condition if the first condition is satisfied; and
  attempting to close the clutch to couple the internal combustion engine to the driveline if the second condition is satisfied.

According to a further aspect of the invention there is provided a method of starting a vehicle comprising: determining whether a parameter is indicative of a high energy storage means capability or low energy storage means capability; in the case of high energy storage means capability, monitoring satisfaction of one condition; in the case of low energy storage means capability, monitoring satisfaction of a different condition; and attempting to close a clutch to couple a prime mover to a driveline if the relevant condition is satisfied, wherein the one condition is for a normal amount of clutch slip, and wherein the different condition is for allowing more clutch slip. The energy storage means may be the aforementioned traction battery. The prime mover may be the aforementioned internal combustion engine. The one condition may be the aforementioned engine idle speed condition. The different condition may be the aforementioned second condition. The parameter may be the temperature-dependent parameter. Whether there is high energy storage capability or low energy storage capability may be judged in relation to the aforementioned threshold.

According to a further aspect of the invention there is provided a system comprising means for causing any one or more of the methods described herein to be performed. The system may be for starting a hybrid vehicle comprising an internal combustion engine, an electric motor coupled to a driveline of the hybrid vehicle, a traction battery configured to supply energy to the electric motor, and an open clutch decoupling the internal combustion engine from the driveline, the system comprising:

means for determining whether a temperature-dependent parameter associated with the traction battery satisfies a first condition;
starting the electric motor;
monitoring satisfaction of a second condition while internal combustion engine speed is greater than zero; and
attempting to close the clutch to couple the internal combustion engine to the driveline if the second condition is satisfied.

Said means for determining whether a temperature-dependent parameter associated with the traction battery satisfies a first condition, and said means for monitoring satisfaction of a second condition while internal combustion engine speed is greater than zero, may comprise at least one electronic processor having an electrical input for receiving at least a signal indicative of a value of the temperature-dependent parameter; and at least one memory device electrically coupled to the electronic processor and having instructions stored therein.

Said means for starting the electric motor and said means for attempting to close the clutch to couple the internal combustion engine to the driveline if the second condition is satisfied may comprise at least one electronic processor being configured to access at least one memory device and execute the instructions stored therein to cause at least one control signal to be transmitted to start the electric motor and to cause at least one control signal to be transmitted to attempt to close the clutch.

In some examples, the system comprises at least one of the above-mentioned hardware components which include the internal combustion engine, the clutch, the traction battery, the electric motor, etc.

According to a further aspect of the invention there is provided an apparatus comprising means for causing any one or more of the methods described herein to be performed. In some examples, the apparatus comprises an electronic controller and the means comprises: at least one electronic processor; and at least one electronic memory device electrically coupled to the electronic processor and having instructions stored therein, the at least one electronic memory device and the instructions configured to, with the at least one electronic processor, cause any one or more of the methods described herein to be performed. The method may be performed by a system such as disclosed above.

According to a further aspect of the invention there is provided a vehicle comprising the system or the apparatus or the electronic controller.

According to a further aspect of the invention there is provided a computer program that, when run on at least one electronic processor, causes any one or more of the methods described herein to be performed.

According to a further aspect of the invention there is provided a non-transitory computer readable storage medium comprising a computer program that, when run on at least one electronic processor, causes any one or more of the methods described herein to be performed.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
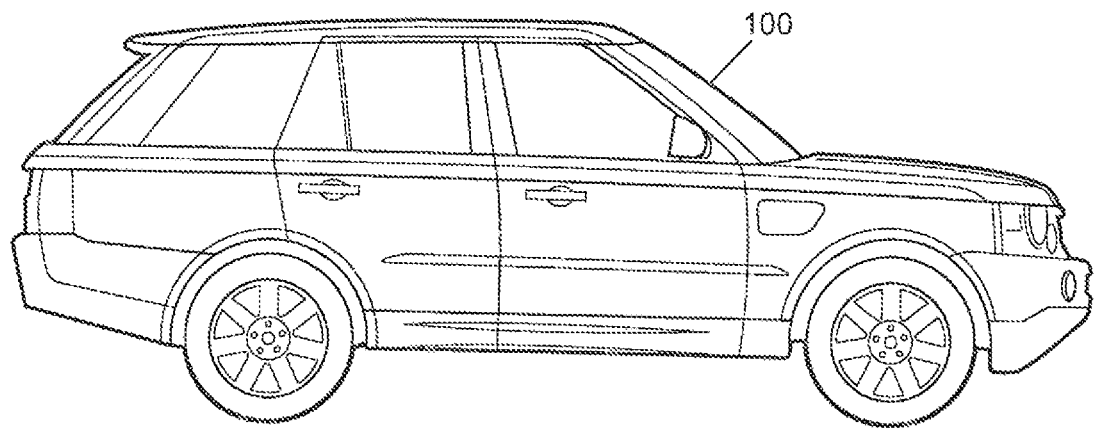
FIG. 1 shows an example of a vehicle.

FIG. 1 illustrates an example of a vehicle 100 in which embodiments of the invention can be implemented. In some, but not necessarily all examples, the vehicle 100 is a passenger vehicle, also referred to as a passenger car or as an automobile. Passenger vehicles generally have kerb weights of less than 5000 kg. In other examples, embodiments of the invention can be implemented for other applications, such as industrial vehicles, air or marine vehicles.

Figure 3:
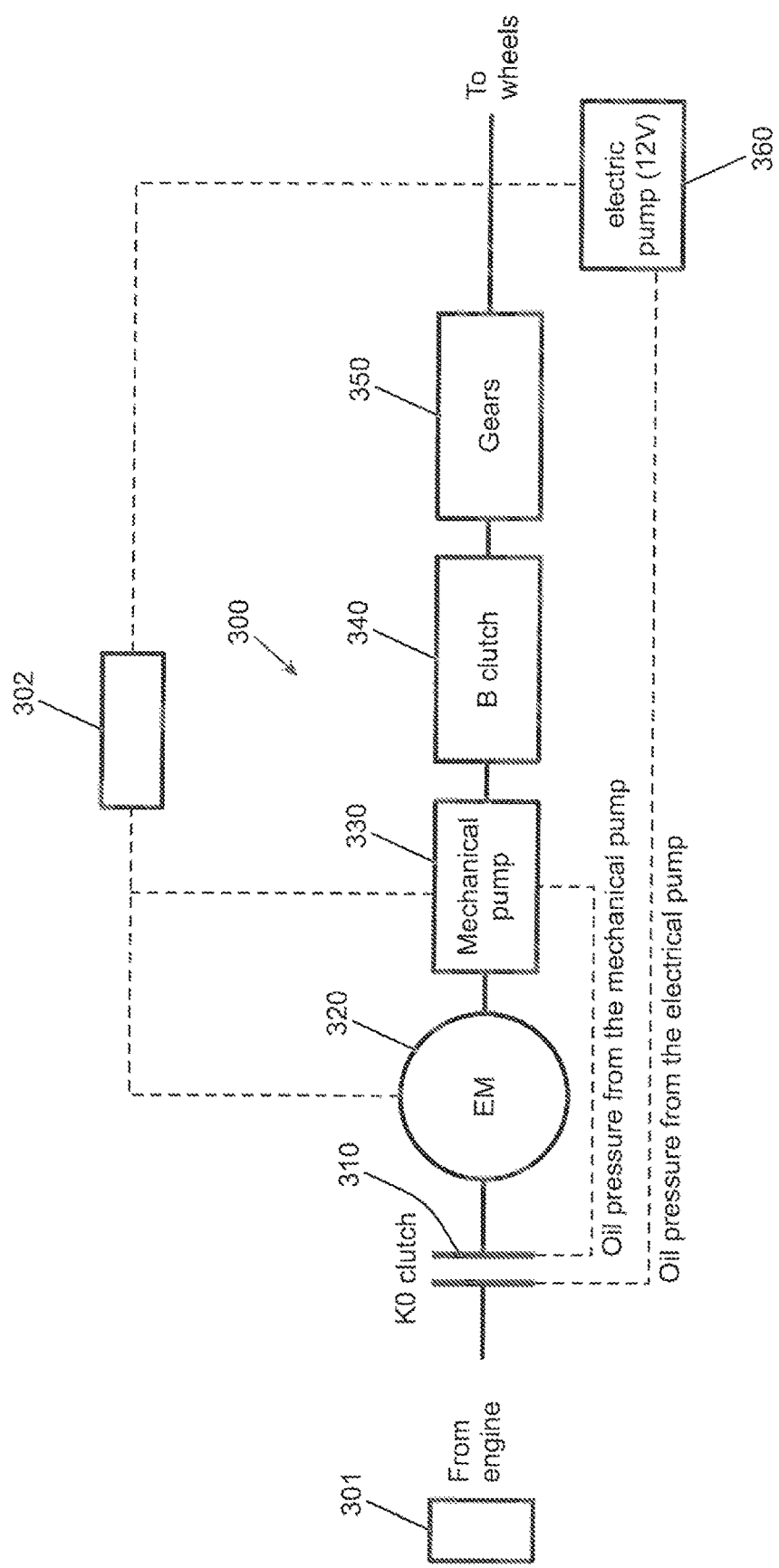
FIG. 3 shows an example of some components of the vehicle.

FIG. 3 illustrates a hybrid vehicle powertrain architecture applicable to the vehicle 100 of FIG. 1. The architecture in FIG. 3 comprises an internal combustion engine 301 (abbreviated to 'engine') and an electric motor 320. The electric motor 320 may be one of a crankshaft integrated starter generator (CISG), a crankshaft integrated motor generator (CIMG) or a belt integrated starter generator (BISG), or a different type in other examples.

Energy for the electric motor 320 is supplied by an energy storage means. The disclosure is relevant to any energy storage means which suffers from reduced efficiency at low temperatures in the 0° C. to −50° C. range.

In some, but not necessarily in all examples the energy storage means is a traction battery for storing electric charge. Traction batteries are known in the art and unlike auxiliary 12V batteries comprise a plurality of cells, often hundreds or thousands of cells, and operate in a regime of hundreds of volts rather than tens of volts. In some, but not necessarily all examples the traction batteries is of a type which suffers from reduced electrochemical performance at low temperatures in the 0° C. to −50° C. range. A Lithium ion battery is an example of such a battery.

The electric motor 320 and engine 301 are configured to be coupled to the vehicle driveline such that in use positive output torque from the engine 301 increases the tractive force exerted by the vehicle 100 on a surface, and positive output torque from the electric motor 320 increases the tractive force.

Other vehicle features not shown in FIG. 3 include a high-voltage bus, a low-voltage bus and a human machine interface. High-voltage buses are for supplying energy from the traction battery to one or more subsystems such as: a DC-DC converter for interfacing with the low-voltage bus; an AC-DC converter for interfacing with a charging port; a climate control compressor; a vehicle interior heating subsystem; a power steering subsystem; an engine cooling subsystem; a DC-AC converter for engine functions, etc. Low-voltage buses are for supplying energy from the DC-DC converter and/or an auxiliary battery (e.g. 12V battery) to one or more subsystems such as: head lights; tail lights; heating fans; infotainment, etc. The human-machine interface may comprise a display or other output further configured to convey a 'ready' and/or 'not ready' message to a vehicle user indicating whether the vehicle powertrain is connected to the driveline and ready to generate torque loads.

FIG. 3 shows not only the vehicle powertrain architecture but also a section of a drivetrain architecture which may be configured to implement some, but not necessarily all embodiments of the invention. In the drivetrain architecture, solid lines represent mechanical couplings able to transmit torque by means of rotation. Short dashed lines represent hydraulic couplings. Long dashed lines represent electrical couplings.

The engine 301 is mechanically coupled to a clutch labelled 'K0' in FIG. 3. The K0 clutch 310 resides between the engine 301 and a transmission. The K0 clutch 310 provides a torque coupling between the engine 301 and the transmission. The transmission is on the wheel side of the K0 clutch 310 rather than on the engine side.

In some, but not necessarily all examples the K0 clutch 310 is located where a torque converter would otherwise be located in an automatic transmission. The K0 clutch 310 may be located within a transmission bell-housing. The transmission may comprise a separate 'B clutch' 340 providing at least some of the functionality of a torque converter. The illustrated transmission also comprises gears 350 providing the vehicle 100 with a number of 'speeds'—three to nine speeds being commonplace.

In some, but not necessarily all examples, the transmission is an automatic transmission and the K0 clutch 310 is configured to be controlled automatically. The vehicle 100 contains no user controls for fine adjustment of the position of the K0 clutch 310.

The K0 clutch 310 is configured to be actuated by a system that controls clutch actuation. If the system is hydraulic or pneumatic, clutch actuation requires a minimum energy density in the form of pressure. If the system is electromagnetic, the required energy density is a minimum electromagnetic field strength. An example system is a pump-driven oil system.

In FIG. 3, two pump-driven oil systems are shown each of which are capable of supplying energy for applying oil pressure for actuating the K0 clutch 310. In other examples one pump-driven oil system is provided.

A first pump-driven oil system comprises a mechanical oil pump 330 which is configured to be powered by mechanical energy from the driveline, for example via a coupling such as a belt, chain or gears. The coupling is on the wheel side of the K0 clutch 310 rather than on the engine side of the K0 clutch 310. For example, the coupling may be from a location in the transmission. The mechanical pump 330 may be a transmission oil pump configured to supply oil to a plurality of transmission components.

A second pump-driven oil system is an electric oil pump 360 which is configured to be powered by electrical energy from the traction battery and/or an auxiliary 12V battery.

The K0 clutch 310 is configured to be open while the vehicle 100 is stopped and key-off. In key-off, the mechanical pump 330 and/or electrical pump 360 is inoperative and pressure in the system is low. When key-off, the powertrain is unable to produce tractive force. When key-on, the powertrain is able to produce tractive force in response to a torque demand. In some examples, whether the vehicle 100 is key-off or key-on depends on driver action. For example, whether the vehicle 100 is key-off or key-on depends on the actuation state of a user control such as a start button or other ignition switch.

The initially open position of the K0 clutch 310 while the engine 301 is stopped means that output torque from the engine 301 itself cannot supply the energy to the mechanical pump 330 for closing the K0 clutch 310. If engine running is required when the vehicle 100 enters key-on, for example due to insufficient state of charge in the traction battery, energy for closing the K0 clutch 310 must be supplied from elsewhere.

The electric motor 320 can supply the required energy for closing the K0 clutch 310 because the electric motor 320 is on the wheel-side of the K0 clutch 310 rather than the engine side. The electric motor 320 is configured to supply output torque directly to the driveline by rotating the mechanical couplings. The rotation drives the mechanical pump 330 via the coupling between the mechanical pump 330 and the driveline. This enables sufficient oil pressure to build up for the K0 clutch 310 to be closed.

The electric pump 360 alone might be able to supply to required energy but this may not be possible depending on the circumstances. The electric pump 360 may be inoperable in freezing conditions or in other extreme operating scenarios. Further, it would be beneficial for the driveline rotational speed to be at or near engine idle speed before the K0 clutch 310 is closed, because if the speed difference is too high the engine 301 will be subject to a sudden negative torque due to the inertia of the driveline. The engine 301 could stall. Therefore, it is beneficial to use the electric motor 320 to drive the mechanical pump 330.

In some operating scenarios, the traction battery may only be capable of supplying a lower than normal rate of energy (power) to the electric motor 320, resulting in electrical brown-out in which the electric motor speed and torque is low. As a result, oil pressure may be insufficient to close the K0 clutch 310.

One such operating scenario is cold-soak, in which the temperature of the traction battery cells is very low. This could be an issue particularly for implementations in which the engine 301 is incapable of charging the traction battery at all, or at least at a reasonable rate.

Figure 4:
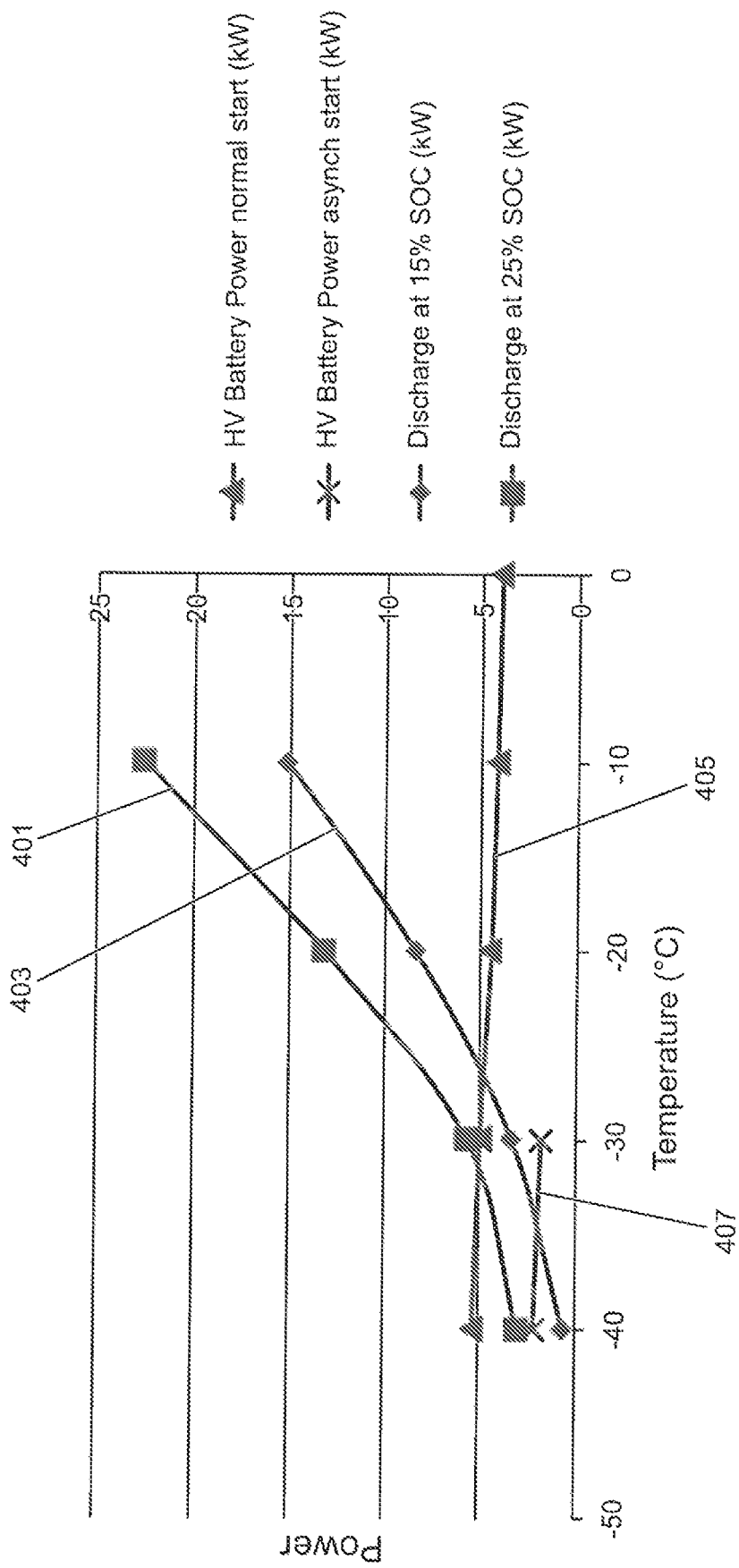
FIG. 4 shows an example graph illustrating variation of traction battery power with temperature and state of charge.

Lines 401 and 403 of FIG. 4 illustrate the variation of a rate of energy delivery from the traction battery (y-axis, units of power kW) with traction battery cell temperature (x-axis, units of Celsius ° C.). The temperature axis extends from −40° C. to 0° C., a temperature range that may be common for northern latitudes and/or high altitudes. Both lines illustrate a substantial drop off in power as temperatures decrease from −10° C. to −40° C.

It can be seen that the rate of energy delivery from the traction battery (also referred to herein as 'discharge capability') is a temperature-dependent parameter.

Line 401 represents the power-temperature curve for 25% state of charge (SoC), and line 403 represents the power-temperature curve for 15% SoC. Line 403 is below line 401, showing that as SoC reduces the available power also reduces. Therefore, the rate of energy is also state-of-charge-dependent.

Line 405 represents power consumed by the electric motor 320 for generating sufficient oil pressure to actuate the K0 clutch 310 and for avoiding clutch slip. Line 407 represents power consumed by the electric motor 320 for generating sufficient oil pressure to actuate the K0 clutch 310 and for allowing some clutch slip. The power consumed in line 405 is higher because the electric motor 320 will have to reach a higher speed. Further, the power required increases slightly with falling temperature in both lines 405 and 407.

A test was also performed in which a system 300 similar to that shown in FIG. 3 was cold-soaked to temperatures between –20° C. and –40° C. The time taken for the electric motor 320 to reach 400 revolutions per minute (rpm) was 0.3 s at –20° C., and 1.2 s at –35° C. —a four-fold increase in time despite the same electrical power being applied to the electric motor 320 at each temperature. 400 rpm is generally a sufficient speed for the mechanical pump 330 to generate sufficient oil pressure to close the K0 clutch 310, in the range 0° C. to –40° C.

The system 300 of FIG. 3 is just one example. In other implementations, the system may comprise more or fewer elements than those shown in FIG. 3, and the elements may be ordered differently.

The system 300 of FIG. 3 is operable under the direct or indirect control of one or more electronic controllers of the vehicle 100. The one or more electronic controllers may advantageously be configured to implement different strategies for closing the K0 clutch 310 in dependence on the rate of energy delivery of the traction battery or some other temperature-dependent parameter.

In some, but not necessarily all examples, the one or more electronic controllers comprises:

- a vehicle supervisory controller (VSC) which may function as a hybrid powertrain controller. The VSC may have supervisory control of several aspects of the present disclosure;
- A transmission controller (TCM), which may be configured to control transmission functions. The TCM may also control the electric motor 320. The TCM may detect and control electric motor speed. Electric motor speed may be sensed by one or more sensors of the speed of the electric motor 320 or of another driveline component rotatable at a speed proportional to electric motor speed;
- A traction battery controller. The traction battery controller monitors various battery attributes from sensors on the traction battery, and calculates parameter(s) indicative of at least one of the following battery attributes: battery health; state of charge; temperature of at least part of the traction battery as measured by one or more temperature sensors supplied with the traction battery (e.g. average temperature of a plurality of cells and/or a coldest cell temperature, or any other temperature inside or near the traction battery); rate of energy delivery (power, kW), etc. The published rate of energy delivery may be an estimation of the maximum power that can be discharged/continually discharged from the traction battery for one or more pre-defined time periods (such as 4 seconds or 10 seconds). The parameter(s) may be published to a communication bus to be made available to other controllers;
- An engine management system (EMS/ECU) for controlling engine functions; and
- At least one power supply system controller (PSS) for controlling a voltage bus for supplying power to one or more energy consuming subsystems. A PSS may be provided for a low voltage (e.g. 12V) bus.

The above-mentioned controllers may be configured to communicate with one another using an appropriate communications protocol such as a 'Controller Area Network' (CAN).

Figure 2:
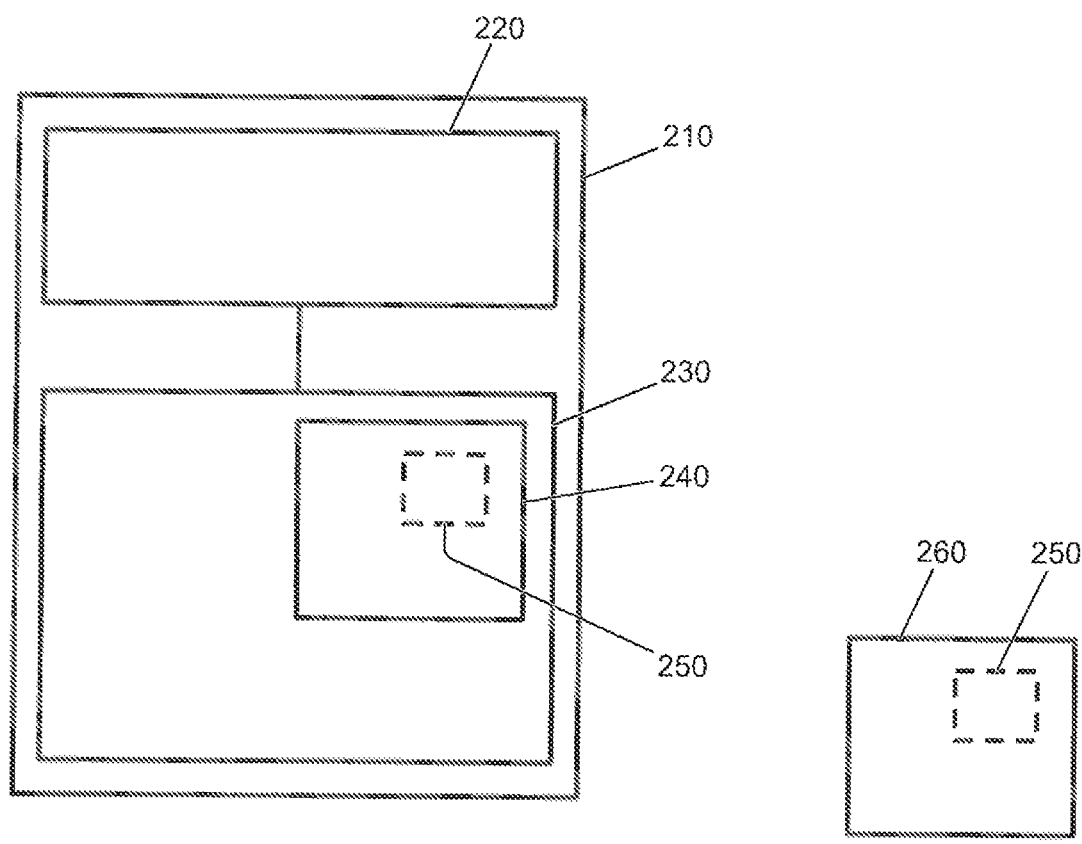
FIG. 2 shows an example of an electronic controller.

FIG. 2 illustrates an example architecture for an electronic controller 210. The electronic controller 210 comprises at least one electronic processor 220; and at least one electronic memory device 230 electrically coupled to the electronic processor 220 and having instructions 250 stored therein, the at least one electronic memory device 230 and the instructions 250 configured to, with the at least one electronic processor 220, cause any one or more of the methods described herein to be performed. The instructions 250 may be stored in a computer program 240 stored in the electronic memory device 230.

For purposes of this disclosure, it is to be understood that the electronic controller(s) described herein can each comprise a control unit or computational device having one or more electronic processors. A vehicle 100 and/or a system 300 thereof may comprise a single control unit or electronic controller or alternatively different functions of the electronic controller(s) may be embodied in, or hosted in, different control units or electronic controllers. A set of instructions could be provided which, when executed, cause said electronic controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first electronic controller may be implemented in software run on one or more electronic processors, and one or more other electronic controllers may also be implemented in software run on or more electronic processors, optionally the same one or more processors as the first electronic controller. It will be appreciated, however, that other arrangements are also useful, and therefore, the present disclosure is not intended to be limited to any particular arrangement. In any event, the set of instructions 250 described above may be embedded in a computer-readable storage medium 260 (e.g., a non-transitory computer-readable storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM ad EEPROM); flash memory; or electrical or other types of medium for storing such information/instructions.

Figure 5:
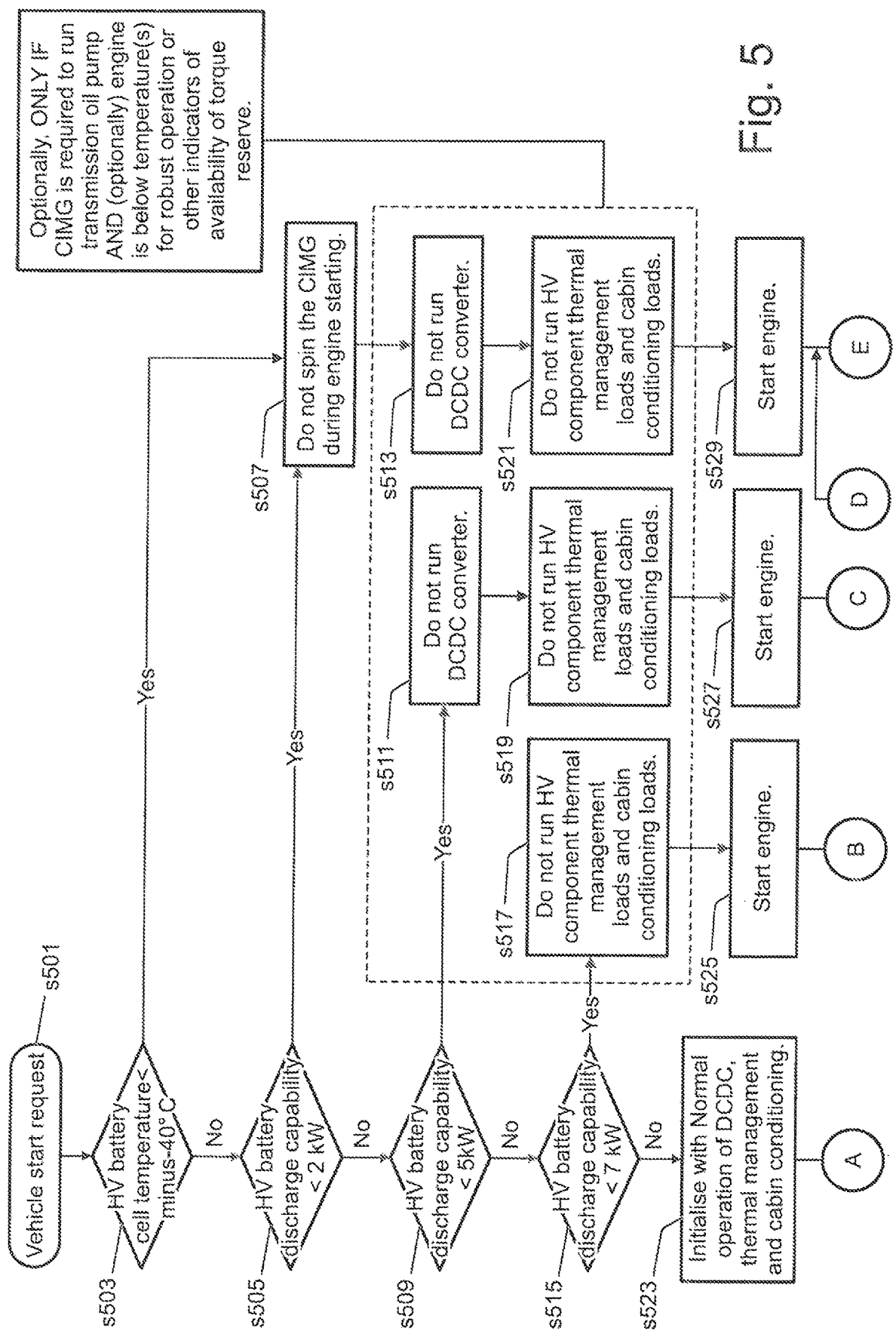
FIGS. 5-7 show example flowcharts.
Figure 6:
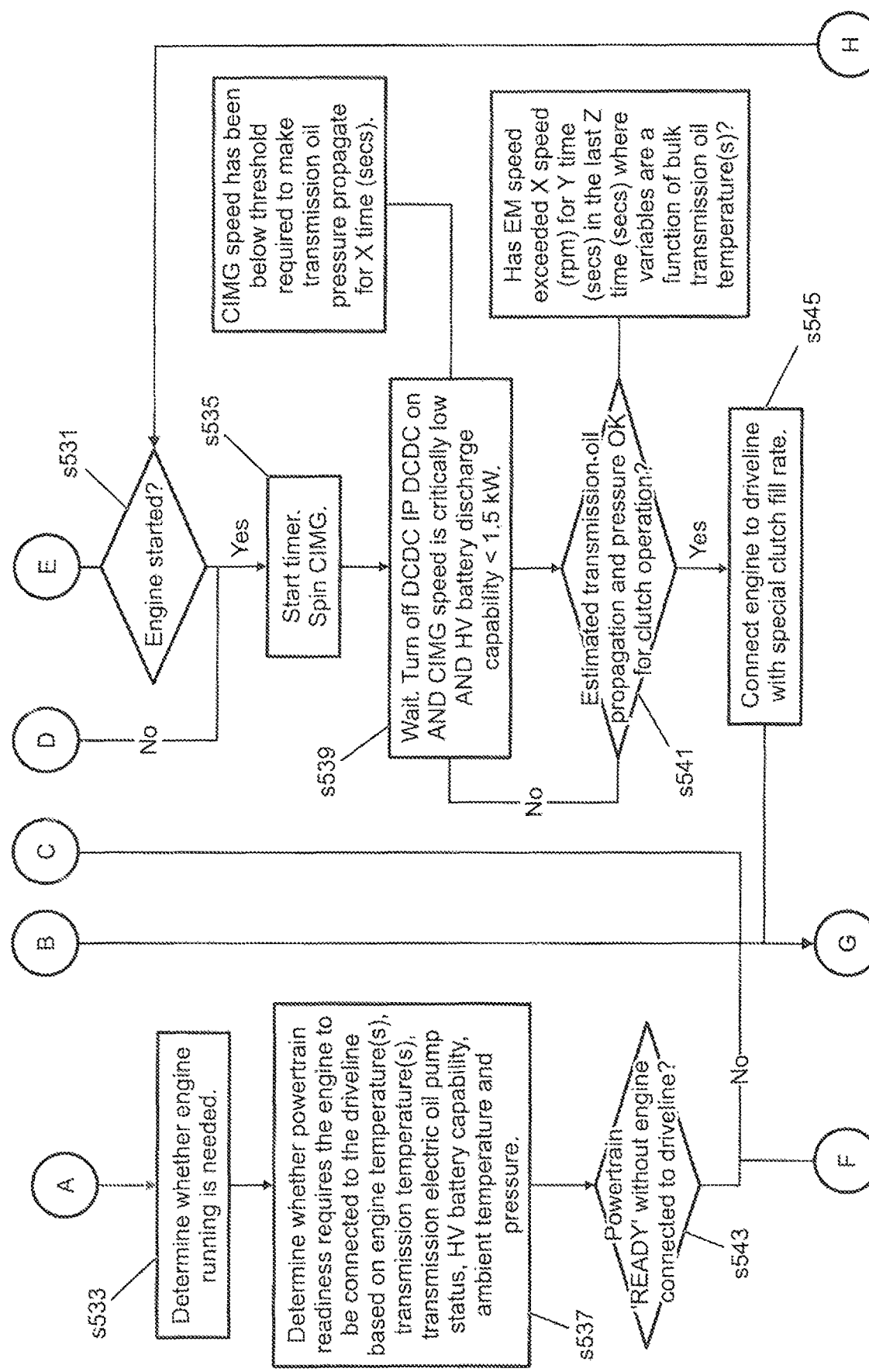
Figure 7:
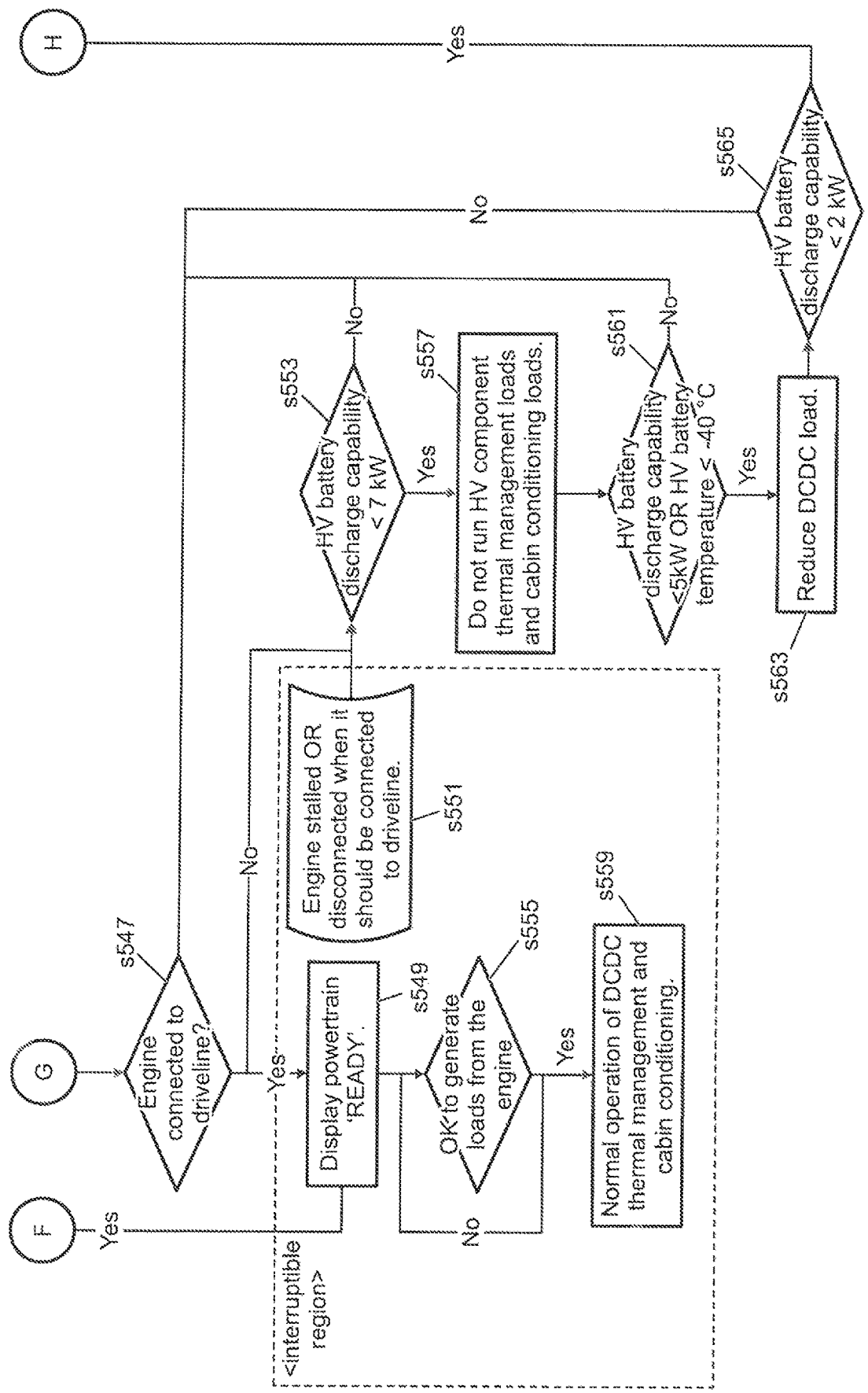

FIGS. 5-7 illustrate example flow-charts for implementing an advantageous control strategy that accounts for traction battery cold-soak and/or other extreme conditions. The blocks of the flow-chart may be implemented by one or several electronic controllers.

From FIGS. 5-7 can be derived a method for starting a hybrid vehicle 100 comprising an internal combustion engine 301, an electric motor 320 coupled to a driveline of the hybrid vehicle 100, a traction battery configured to supply energy to the electric motor 320, and an open clutch decoupling the internal combustion engine 301 from the driveline, as claimed in the independent claims.

The flow-charts show:
- determining whether a temperature-dependent parameter associated with the traction battery satisfies a first condition (relates to at least part of s503 and/or s505, FIG. 5);
- starting the electric motor 320 (relates to at least part of s507, FIG. 5);
- monitoring satisfaction of a second condition while internal combustion engine speed is greater than zero (relates to s541, FIG. 6); and
- attempting to close the clutch to couple the internal combustion engine 301 to the driveline if the second condition is satisfied (relates to at least part of s545, FIG. 6).

For the avoidance of doubt, blocks in the flow-charts other than the above-mentioned blocks are non-essential even if they may be particularly advantageous, except those claimed independently. Not all aspects of the above-mentioned blocks are necessarily essential, except those claimed independently. The blocks may be performed in any suitable order for realising claimed advantageous effects.

The flow-chart starts at terminator block s501, FIG. 5. A vehicle start request is received. The request may be initiated by manual user action. The request may be for entering a key-on state, wherein the engine 301 and electric motor 320 are currently stopped (vehicle 100 is key-off).

The next block is decision block s503, FIG. 5. The decision block s503 determines whether a temperature-dependent parameter associated with the traction battery satisfies a first condition.

In s503, but not necessarily in all examples, the temperature-dependent parameter is a temperature of at least part of the traction battery. In some examples, the temperature is published by the traction battery controller. In other examples the temperature may be published from another sensor on another part of the vehicle 100, but may be taken as indicative of the probable temperature of the traction battery. In some examples, the temperature is a cell temperature of the traction battery.

In s503, but not necessarily in all examples, the first condition is capable of being satisfied if a temperature indicated by the temperature-dependent parameter is below a threshold. In the context of below-freezing (0° C.) temperatures, below a threshold means further from 0° C. rather than closer to 0° C. In s503, the threshold is −40° C. but another value in the range −20° C. to −40° C. could be appropriate in other examples. The threshold may be a value calibrated to the specific hardware such as traction battery type (Li-ion etc.). In S503, the first condition is satisfied if traction battery cell temperature is below −40° C.

If the first condition is not satisfied (e.g. warmer temperatures), the flow-chart proceeds to decision block s505.

Decision block s505 is additional to or alternative from block s503. The decision block s505 determines whether a temperature-dependent parameter associated with the traction battery satisfies a first condition.

In s505, but not necessarily in all examples, the temperature-dependent parameter is a rate of energy delivery of the traction battery, e.g. power (kW). In some examples, the rate of energy delivery is published by the traction battery controller.

In s505, but not necessarily in all examples, the first condition is capable of being satisfied if the rate of energy delivery indicated by the temperature-dependent parameter is below a threshold. In s505, but not necessarily in all examples, below a threshold means a lower positive rate (e.g. 1 kW) than a threshold (e.g. 2 kW). In s505, the threshold is 2 kW but another value in the range 1.5 kW to 4.5 kW could be appropriate in other examples.

If both decision blocks s503 and s505 are implemented, the first condition may be satisfied if just one of the decision blocks returns a positive outcome that the temperature-dependent parameter is below a threshold. In other examples, further decision blocks may be implemented for testing other temperature-dependent parameters or other parameters associated with the traction battery. The first condition is not satisfied only if both/all of the decision blocks return a negative outcome.

The flow-charts then split into branches based on the outcome of the test of the first condition. The left-most branch in FIGS. 5 and 6 relates to the scenario in which the first condition is not satisfied, for example due to normal temperature (>−40° C.) and power (>2 kW).

This first left hand branch defines a 'normal' strategy for engaging the K0 clutch 310 and contains blocks s523, s533, s537 and s543, FIGS. 5-6.

Block s523, FIG. 5 clarifies that operation of one or more high-voltage bus or low-voltage bus subsystems is not inhibited. Block s523 does not necessarily require an action to be performed. The subsystems which are not inhibited may include, for example at least one of: the DC-DC converter; a chassis electrical subsystem; all consumers on a voltage bus other than the electric motor 320; a vehicle lighting subsystem; or a heating or cooling subsystem. In the illustrated example of s523, the DC-DC subsystem is not inhibited, thermal management loads are not inhibited, and cabin climate conditioning is not inhibited.

The term 'inhibit' refers to reducing some or all of the energy allocated to a component, depending on implementation. An inhibit step may involve transmitting an inhibit electronic signal to a relevant electronic controller or circuitry. Not inhibiting a subsystem may involve not transmitting such a signal.

The next block s533, FIG. 6 determines whether engine running is needed in response to the vehicle start request.

In the next block s537, FIG. 6, it is determined whether the engine 301 needs to be connected to the driveline. In other words, can the vehicle 100 be driven on electric power alone in response to the vehicle start request? The determination may be with reference to at least one of: engine temperature; transmission temperature; electric oil pump status; battery capability such as state of charge or discharge capability; ambient temperature; or ambient pressure.

In the next decision block s543, FIG. 6, it is determined whether the powertrain is ready without the engine 301 connected to the driveline. Powertrain readiness means that the vehicle 100 is ready to drive using tractive force from the powertrain via the driveline. If from block s543 it is determined that powertrain readiness requires the engine 301 to be on (started) and connected to the driveline, the engine 301 will be started and the K0 clutch 310 will be engaged according to a normal procedure.

In the normal procedure, the ECU or other relevant controller commands an engine start if required, which causes a starter motor to apply torque to the engine 301 and to increase the engine speed from zero/static. The electronic controller(s) 210 that perform the other steps of this flow-chart may or may not be aware of this step having been performed, and may be aware of current engine speed or other engine control signals.

In the normal procedure, the electric motor 320 may be controlled to start rotation during engine starting even before the engine 301 has reached idle speed, to minimise delay. In the normal procedure, the K0 clutch 310 will be engaged when the electric motor speed matches an engine idle speed condition.

For example, to meet the engine idle speed condition the EM speed must match or be within close range of the current engine idle speed, either instantaneously or over a period of time, or at least above a threshold in the range 500 rpm to 2200 rpm representing the kind of idle speeds that would be expected soon after starting the engine 301. If the engine idle speed condition is satisfied, minimal slippage of the K0 clutch 310 will occur during its engagement, which reduces NVH.

Following a positive outcome to block s543, a check step s547, FIG. 7 checks that the engine 301 is now connected to the driveline. The determination is whether the K0 clutch 310 has successfully engaged and that the engine 301 is able to transmit output torque to the driveline via the K0 clutch 310. This determination may be made with reference to an appropriate signal from a controller or sensor.

The next block s549, FIG. 7 causes a 'ready' message to be conveyed to the vehicle user via a human-machine interface.

Following block s549, a check step s555, FIG. 7 indicates whether it is ok to generate loads from the engine 301, and if so the flowchart proceeds to s559, FIG. 7 in which any inhibited/off subsystems that would otherwise have been uninhibited before the K0 clutch 310 is engaged, are restored to normal uninhibited function. For example, the DC-DC, thermal management and cabin conditioning loads are returned to normal function if they were inhibited up to this point.

If from decision block s543, FIG. 6 it was determined that powertrain readiness does not require the engine 301 to be on, i.e. the vehicle 100 can be driven on electric power alone, the flowchart progresses to block s549, FIG. 7 bypassing block s547, FIG. 7.

The flow charts, contain further optional branches for use cases in which the temperature-dependent parameter indicates an undesirable operating scenario which is not necessarily sufficiently extreme to satisfy the first condition.

A second branch includes decision block s509, FIG. 5 which must be performed before progressing from block s503 and/or s505 to a block in the first branch such as s523. The second branch then flows from decision block s509 to blocks s511, s519 and s527, FIG. 5 before rejoining the first branch at s547, FIG. 7 or later.

The decision s509 requires a temperature-dependent parameter such as the rate of energy delivery (e.g. power, kW) to pass a first threshold. The first threshold is higher than the threshold associated with satisfaction of the first condition. For example, if the first condition is satisfied by a rate of energy delivery of <2 kW, an appropriate first threshold would be a value greater than 2 kW. In the flowchart, the first threshold is 5 kW. In other examples, the first threshold could be a value in the range 2.5 kW to 6.5 kW. If the rate of energy delivery is above the first threshold, the decision s509 is negative and the flow-chart progresses directly or indirectly to block s523, FIG. 5. If below, the flowchart passes progresses to block s511, FIG. 5.

Blocks s511 and s519 differs from block s523 in that energy supply from the traction battery to at least one vehicle subsystem is inhibited. In some examples, the energy supply is inhibited at least until after the K0 clutch 310 has been successfully closed. Each of blocks s511 and s519 represent inhibiting a different vehicle subsystem. In some examples, the or each subsystem in each block s511, s519 is one of the subsystems listed against block s523. The number of subsystems to be inhibited depends on implementation.

In the example of FIGS. 5-7, s511 comprises inhibiting the DC-DC converter and s519 comprises inhibiting thermal management loads and cabin climate conditioning.

At block s527, FIG. 5, the engine 301 may be started and/or the electric motor 320 may be started in the same 'normal' manner as described above following block s543, FIG. 6.

A third branch includes decision block s515, FIG. 5 which must be performed before progressing from block s503 and/or s505 and/or s509 to a block in the first branch such as s523. The third branch then flows from decision block s515 to blocks s517 and s525, FIG. 5 before rejoining the first branch at s547, FIG. 7 or later.

The decision s515 requires a temperature-dependent parameter such as the rate of energy delivery (e.g. power, kW) to pass a second threshold. The second threshold is higher than the first threshold and than the threshold associated with satisfaction of the first condition. For example, if the first threshold is satisfied by a rate of energy delivery of <5 kW, an appropriate second threshold would be a value greater than 5 kW. In the flowchart, the second threshold is 7 kW. In other examples, the second threshold could be a value in the range 5.5 kW to 50 kW or 5.5 kW to 10 kW. If the rate of energy delivery is above the second threshold, the decision s515 is negative and the flow-chart progresses directly or indirectly to block s523. If below, the flowchart passes progresses to block s517. Block s517 is the same as block s519. The next block s525 is the same as the block s527.

The above three branches relate to normal or near-normal operation, in which the first condition was not satisfied in block s503 and/or s505.

The fourth, right hand branch in FIGS. 5-7 relates to extreme conditions in which the first condition was satisfied in at least one of blocks s503 or s505. The fourth branch progresses from block s503 or s505, FIG. 5 through blocks s507, FIG. 5, s513, FIG. 5, s521, FIG. 5, s529, FIG. 5, s531, FIG. 6, s535, FIG. 6, s539, FIG. 6, s541, FIG. 6 and s545, FIG. 6 before rejoining the other branches at s547 or later.

Block s507 is a decision not to start the electric motor 320 during a starting process of the engine 301; This means that the electric motor speed increases from zero after the engine 301 has started. This is to save energy compared to the normal scenario described above in relation to blocks s543, FIG. 6, s525, FIG. 5, s527, FIG. 5.

The engine 301 may be considered to have started if the engine 301 is running under its own power, in other words a starter motor has completed cranking of the engine 301. The engine 301 may be considered started if it has reached a stable idle speed. Such events may be detected from the ECU or from other electronic signals.

In some, but not necessarily all examples the flow-charts may inhibit energy supply to one or more subsystems until after the K0 clutch 310 has been successfully closed. Block s513, FIG. 5 is the same as block s511, FIG. 5. Block s521, FIG. 5 is the same as block s519, FIG. 5 and the same as block s517, FIG. 5.

At the next block s529, FIG. 5, the engine 301 is started. The manner in which the engine 301 is started is as described in relation to s543, FIG. 6, s525, FIG. 5 and s527, FIG. 5.

The next decision block s531, FIG. 6 checks whether the engine 301 is successfully started, for example according to a status published by a controller such as the Hybrid Powertrain Controller. The condition for the status indicating a successful start may be that the engine is being fuelled and engine rotation is above a threshold speed. The threshold speed may in some examples be above the speed that can be achieved by the starter motor, e.g. a value of 300 rpm. If the outcome is negative, the flow-chart loops until the engine 301 has successfully started.

At the next block s535, FIG. 6, the electric motor speed is increased, e.g. from zero/static. This differs from normal operation in that the flowchart has waited for engine start to complete, to save energy. In other examples the electric motor speed may increase during engine start as normal.

An optional extra feature of block s535 is to start a timer so that a timeout condition can be checked later in the flow-chart. The timer may run from when the electric motor 320 is first controlled to increase its speed.

The next block may be s539, FIG. 6 or may alternatively be s541, FIG. 6 depending on implementation.

Assuming block s541 is performed first, decision block s541 monitors satisfaction of a second condition. The second condition is for deciding when to attempt to close the K0 clutch 310. In some examples, the second condition is calibrated so that it is easier to satisfy than any equivalent condition used in normal operation (first condition not met) such as the engine idle speed condition. The second condition is easier to satisfy so that it is achievable even when the electric motor 320 is subject to brown-out conditions associated with a cold-soaked battery or other extreme conditions.

Satisfaction of the second condition is indicative that energy density in a system driven by the electric-motor for closing the clutch (e.g. fluid propagation and pressure) is necessary and sufficient (above a minimum) for the K0 clutch 310 to be engaged without engine stall. The fluid for closing the clutch may be transmission oil or any other appropriate liquid or gas pressurized by the mechanical pump 330 and/or electric pump 360.

In block s541, FIG. 6 but not necessarily all examples, satisfaction of the second condition is dependent on electric motor speed. The second condition may be satisfied in the situation where, for example, electric motor speed is above a threshold. The threshold electric motor speed may be in the range 210 rpm to a predetermined value (e.g. 60 rpm) subtracted from current engine idle speed. In some examples the range may be 210 rpm to 400 rpm. In other examples, the second condition may be satisfied when a difference between electric motor speed and current engine idle speed is below a threshold.

Electric motor speed may have a predictable predetermined relationship with oil propagation and pressure. Oil pressure may be assumed to be present but not ideal if electric motor speed is passing 210 rpm. Oil may be assumed to be propagating reliably when electric motor speed is passing 410 rpm. Oil pressure may be assumed to be OK when electric motor speed has been above 410 rpm for longer than a predetermined time.

The second condition may be variable. For example, the electric motor speed threshold may depend on a measured variable. The measured parameter may be temperature-dependent. The measured parameter may be transmission oil temperature.

A further time constraint may therefore be advantageous for ensuring the energy density (e.g. oil pressure) is stable for the attempt. The time constraint may be such that the second condition is satisfied if the electric motor speed is at least at the predetermined minimum speed (above the threshold) for at least a predetermined duration. For example, electric motor speed must remain above a threshold for the last x seconds, or for a cumulative y seconds in the last z second window, where x may be a value from the range 0.2 to 5 seconds, y a value from the range 0.2 to 5 seconds, and z a value from the range 0.3 to 20 seconds wherein z>y.

The predetermined duration may be variable. For example, the predetermined duration may be temperature-dependent. The temperature may be monitored transmission oil temperature. As an example, the predetermined duration could be 4 seconds at −40° C. and 2 seconds at −20° C.

In other examples, instead of measuring electric motor speed, the energy density such as oil pressure itself could be measured and monitored against a threshold if an appropriate sensor is present.

In view of the above, satisfying the second condition requires less consumption of battery energy than satisfying the engine idle speed condition. Any threshold associated with the second condition is easier to pass for satisfying the second condition for a given energy input to the electric motor 320 than any threshold associated with the engine idle speed condition.

Based on some implementations, the clutch engagement will be less smooth than in the normal operation because the speed differential across the K0 clutch 310 will be greater, resulting in more clutch slip. However, less power will be required.

If the second condition is not satisfied at block s541, FIG. 6, the flow-chart loops to block s539, FIG. 6. Block s539 includes an optional wait time before a next check. Block s539 includes a requirement to inhibit energy supply from the traction battery to at least one vehicle subsystem in dependence on the determination that the second condition has not yet been satisfied. The subsystem is one of those listed against block s523, for example the DC-DC subsystem. The subsystem is only inhibited if it has not already been inhibited.

In some examples, the inhibition at block s539 requires not only a determination that the second condition has not yet been satisfied, but also a determination that electric motor speed is below a speed threshold and/or a determination that the rate of energy delivery is below a rate threshold. The rate threshold may be lower than the threshold associated with the first condition, such as 1.5 kW or another value in the range 0.5 kW to 1.9 kW. The speed threshold may be lower than the threshold associated with the second condition, such as 210 rpm or another value in the range 100 rpm to 350 rpm.

Once the second condition is satisfied or after a timeout associated with the timer of block s535, the flow-chart proceeds to block s545, FIG. 6. In block s545, an attempt is made to close the K0 clutch 310. This attempt involves causing any appropriate actuator to apply the oil pressure/energy to the clutch to close it. The attempt is made as quickly as possible after the second condition has been determined to be satisfied, without reducing the electric motor speed.

A special clutch engagement rate may be used, comprising controlling a rate of engagement of the clutch. The oil pressure may be applied to move the clutch in a closing direction more slowly than a normal rate which would otherwise be used in situations where the first condition is not satisfied.

The flow chart then re-joins the other branches proceeds at common decision block s547, FIG. 7. The fourth branch is therefore unique to the case of extremely low energy-dependent parameters detected at the time of the vehicle start request. It can be said that the second condition only needs to be satisfied in extreme conditions indicated by satisfaction of the first condition.

The flow-charts contain an optional loop, which is particularly useful for normal use cases associated with the first to third use branches in which K0 clutch 310 connection attempts are unsuccessful.

The loop starts from a determination in s547, FIG. 7 that the engine 301 is not connected to the driveline even though it should be. If the determination in s547 is 'no', this means that the K0 clutch 310 engagement has been unsuccessful or that the engine 301 has stalled (s551). The engine 301 may have stalled due to the K0 clutch 310 closing attempt.

In some examples, the loop connects a negative outcome of s547 to one of the blocks: s503, FIG. 5, s505, FIG. 5, s507, FIG. 5, s509, FIG. 5, s511, FIG. 5, s513, FIG. 5, s515, FIG. 5, s517, FIG. 5, s519, FIG. 5, s521, FIG. 5, s523, FIG. 5, s525, FIG. 5, s527, FIG. 5, s529, FIG. 5, or s531, FIG. 6. In some examples, the loop connects the negative outcome of s547, FIG. 7 to block s531, FIG. 6.

Additionally or alternatively, and if required, the loop itself includes a number of blocks within the loop for progressively inhibiting one or more subsystems (listed in relation to s523) while a temperature-dependent parameter decreases. For example, the subsystems may be progressively inhibited as the rate of energy delivery drops with an increasing number of unsuccessful connection attempts.

For example, the loop may first contain decision block s553, FIG. 7 which may be the same as block s515, FIG. 5, and block s557, FIG. 7 which may be the same as block s517, FIG. 5. In an example use case, blocks s553 and s557 require that once the rate of energy delivery drops below 7 kW, thermal management loads and cabin climate conditioning loads are inhibited. In other examples, the threshold of block s553 may be the same as or different from the threshold of block s517.

The loop may then contain decision block s561, FIG. 7 which determines whether one of the following conditions is satisfied: a rate of energy delivery is <5 kW; or the temperature is below a threshold such as the same threshold that is associated with the first condition (e.g. −40° C.). If one of the conditions is satisfied, or both in other examples, block s563 is performed which is equivalent to block s511 and to block s513 (inhibit DC-DC subsystem supply). An alternative implementation involves checking only one of the above conditions. In another example, block s561 is the same as block s509, FIG. 5.

The loop may then contain decision block s565, FIG. 7 equivalent to block s505, FIG. 5 (and/or s503, FIG. 5 in other examples), in other words equivalent to a threshold for satisfying the first condition.

In view of s565 and part of s561 of the loop mirroring blocks s503 and s505, it can be said that regardless of which branch is initially followed through the flow-charts, it is possible to end up in the fourth branch, wherein the first condition is either satisfied from the outset (s505 'yes' and/or s503 'yes'), or becomes satisfied later in the event of failures to connect the engine 301 to the driveline (s565, 'yes', temperature part of s561 'yes'). Satisfaction of the second condition is not or is never monitored in the case of non-satisfaction of the first condition, and is monitored in the case of satisfaction of the first condition.

The blocks illustrated in FIGS. 5-7 may represent steps in a method and/or sections of code in the computer program. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed.

Blocks s503, FIG. 5, s505, FIG. 5, s509, FIG. 5, s515, FIG. 5, s539, FIG. 6, s553, FIG. 7, s561, FIG. 7, s565, FIG. 7 all refer to temperature-dependent parameters. In one modification, at least one of the blocks may additionally or alternatively test a different battery parameter that does not necessarily depend on temperature such as: state of charge; a non-battery temperature such as engine temperature; a battery state of health; a number of charge cycles, or the like.

Monitoring of the second condition is described primarily in relation to fluid pressure for engaging the clutch. In a modification, the clutch may be an electromagnetic clutch and satisfaction of the second condition may be indicative that electromagnetic field strength is sufficient.

Features described in the preceding description may be used in combinations other than the combinations explicitly described. Although functions have been described with reference to certain features, those functions may be performable by other features whether described or not. Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A method for starting a hybrid vehicle comprising an internal combustion engine, an electric motor coupled to a driveline of the hybrid vehicle, a traction battery configured to supply energy to the electric motor, and an open clutch decoupling the internal combustion engine from the driveline, the method comprising:
determining whether a temperature-dependent parameter associated with the traction battery satisfies a first condition;
responsive to the temperature-dependent parameter associated with the traction battery satisfying the first condition:
starting the electric motor;
monitoring satisfaction of a second condition while internal combustion engine speed is greater than zero; and
attempting to close the clutch to couple the internal combustion engine to the driveline if the second condition is satisfied; and
responsive to the temperature-dependent parameter associated with the traction battery not satisfying the first condition:
starting the electric motor;
monitoring satisfaction of a different second condition while internal combustion engine speed is greater than zero; and attempting to close the clutch to couple the internal combustion engine to the driveline if the different second condition is satisfied, wherein the second condition is easier to satisfy than the different second condition.

2. The method as claimed in claim 1, wherein the temperature-dependent parameter is a rate of energy delivery from the traction battery or a temperature of the traction battery.

3. The method as claimed in claim 1, wherein if after a timeout the second condition has not been satisfied, further comprising attempting to close the clutch to couple the internal combustion engine to the driveline.

4. The method as claimed in claim 1, wherein if the temperature-dependent parameter does not satisfy the first condition, further comprising attempting to close the clutch if the electric motor speed reaches an engine idle speed condition.

5. The method as claimed in claim 1, further comprising controlling a rate of closing of the clutch in dependence on whether the temperature-dependent parameter satisfies the first condition.

6. The method as claimed in claim 5, wherein if the temperature-dependent parameter satisfies the first condition the rate of closing of the clutch is controlled to be relatively slower than if the temperature-dependent parameter does not satisfy the first condition.

7. The method as claimed in claim 1, wherein energy supply from the traction battery to at least one vehicle subsystem is inhibited until after the clutch has been successfully closed.

8. The method as claimed in claim 7, wherein the at least one vehicle subsystem comprises at least one of:
DC-DC converter;
a chassis electrical subsystem;
all consumers on a voltage bus other than the electric motor;
a vehicle lighting subsystem;
a heating or cooling subsystem.

9. The method as claimed in claim 7, wherein energy supply from the traction battery to the at least one vehicle subsystem is inhibited in dependence on a determination that the second condition has not yet been satisfied.

10. The method as claimed in claim 7, wherein energy supply from the traction battery to the at least one vehicle subsystem is inhibited in dependence on a below-threshold temperature-dependent parameter of the traction battery.

11. The method as claimed in claim 7, wherein energy supply from the traction battery to the at least one vehicle subsystem is inhibited in dependence on a failed attempt to close the clutch.

12. The method as claimed in claim 1, wherein energy supply from the traction battery to a first vehicle subsystem is inhibited in dependence on the temperature-dependent parameter of the traction battery being below a first threshold, and wherein energy supply from the traction battery to a second vehicle subsystem is inhibited in dependence on the temperature-dependent parameter of the traction battery being below a second different threshold.

13. The method as claimed in claim 12, wherein the first vehicle subsystem is associated with thermal management and/or cabin conditioning, wherein the second vehicle subsystem is a DC-DC converter, and wherein the second threshold is lower than the first threshold.

14. A system, comprising:
at least one electronic processor; and
at least one electronic memory device electrically coupled to the at least one electronic processor and having instructions stored therein that, when executed by the at least one electronic processor cause the at least one electronic processor to perform operations comprising:
determining whether a temperature-dependent parameter associated with a traction battery of a hybrid vehicle satisfies a first condition;
responsive to the temperature-dependent parameter associated with the traction battery satisfying the first condition:
starting an electric motor of the hybrid vehicle;
monitoring satisfaction of a second condition while engine speed of an internal combustion engine of the hybrid vehicle is greater than zero; and
attempting to close a clutch of the hybrid vehicle to couple the internal combustion engine to a driveline of the hybrid vehicle if the second condition is satisfied and
responsive to the temperature-dependent parameter associated with the traction battery not satisfying the first condition:
starting an electric motor of the hybrid vehicle;
monitoring satisfaction of a second condition while engine speed of an internal combustion engine of the hybrid vehicle is greater than zero; and
attempting to close a clutch of the hybrid vehicle to couple the internal combustion engine to a driveline of the hybrid vehicle if the second condition is satisfied.

15. The system as claimed in claim 14, wherein energy supply from the traction battery to at least one vehicle subsystem is inhibited until after the clutch has been successfully closed, wherein the at least one vehicle subsystem comprises at least one of:
DC-DC converter;
a chassis electrical subsystem;
all consumers on a voltage bus other than the electric motor;
a vehicle lighting subsystem;
a heating or cooling subsystem.

16. The system as claimed in claim 14, wherein energy supply from the traction battery to a first vehicle subsystem is inhibited in dependence on the temperature-dependent parameter of the traction battery being below a first threshold, and wherein energy supply from the traction battery to a second vehicle subsystem is inhibited in dependence on the temperature-dependent parameter of the traction battery being below a second different threshold, wherein the first vehicle subsystem is associated with thermal management and/or cabin conditioning, wherein the second vehicle subsystem is a DC-DC converter, and wherein the second threshold is lower than the first threshold.

17. A vehicle, comprising:
an internal combustion engine;
an electric motor coupled to a driveline of the vehicle;
a traction battery configured to supply energy to the electric motor;
a clutch configured to decouple the internal combustion engine from the driveline; at least one electronic processor; and
at least one electronic memory device electrically coupled to the at least one electronic processor and having instructions stored therein that, when executed by the at least one electronic processor cause the at least one electronic processor to perform operations comprising:

determining whether a temperature-dependent parameter associated with the traction battery satisfies a first condition;

responsive to the temperature-dependent parameter associated with the traction battery satisfying the first condition:
- starting the electric motor;
- monitoring satisfaction of a second condition while internal combustion engine speed is greater than zero; and
- attempting to close the clutch to couple the internal combustion engine to the driveline if the second condition is satisfied; and responsive to the temperature-dependent parameter associated with the traction battery not satisfying the first condition:
- starting the electric motor;
- monitoring satisfaction of a second condition while internal combustion engine speed is greater than zero; and
- attempting to close the clutch to couple the internal combustion engine to the driveline if the second condition is satisfied.

18. The vehicle as claimed in claim 17, wherein energy supply from the traction battery to at least one vehicle subsystem is inhibited until after the clutch has been successfully closed, wherein the at least one vehicle subsystem comprises at least one of:
- DC-DC converter;
- a chassis electrical subsystem;
- all consumers on a voltage bus other than the electric motor;
- a vehicle lighting subsystem;
- a heating or cooling subsystem.

19. The vehicle as claimed in claim 17, wherein energy supply from the traction battery to a first vehicle subsystem is inhibited in dependence on the temperature-dependent parameter of the traction battery being below a first threshold, and wherein energy supply from the traction battery to a second vehicle subsystem is inhibited in dependence on the temperature-dependent parameter of the traction battery being below a second different threshold, wherein the first vehicle subsystem is associated with thermal management and/or cabin conditioning, wherein the second vehicle subsystem is a DC-DC converter, and wherein the second threshold is lower than the first threshold.

* * * * *